US007774157B2

(12) United States Patent
Bouron et al.

(10) Patent No.: US 7,774,157 B2
(45) Date of Patent: Aug. 10, 2010

(54) CHECKING OF TURBOMACHINE BLADES

(75) Inventors: Alain Henri Daniel Bouron, Melun (FR); Jean-Francois Escuret, Gif sur Yvette (FR); Didier Merville, Breuillet (FR); Laurent Villaines, Vaux le Penil (FR)

(73) Assignee: Snecma, Paris (FR)

( * ) Notice: Subject to any disclaimer, the term of this patent is extended or adjusted under 35 U.S.C. 154(b) by 775 days.

(21) Appl. No.: 11/460,116

(22) Filed: Jul. 26, 2006

(65) Prior Publication Data

US 2007/0025855 A1 Feb. 1, 2007

(30) Foreign Application Priority Data

Jul. 28, 2005 (FR) .................................. 05 08046

(51) Int. Cl.
*G01P 3/00* (2006.01)

(52) U.S. Cl. ....................... 702/147; 702/155; 702/158; 702/167; 702/185

(58) Field of Classification Search ................... 702/41, 702/43-44, 90, 92, 94-95, 97, 105, 138, 702/144-145, 150-154, 167, 182-184, 188
See application file for complete search history.

(56) References Cited

U.S. PATENT DOCUMENTS

| | | | | |
|---|---|---|---|---|
| 3,570,304 | A * | 3/1971 | Mihalyak et al. | 73/632 |
| 4,468,620 | A * | 8/1984 | Vaerman | 324/261 |
| 4,653,011 | A | 3/1987 | Iwano | |
| 4,724,525 | A | 2/1988 | Purcell et al. | |
| 4,795,312 | A * | 1/1989 | Purcaru | 416/223 A |
| 4,803,639 | A * | 2/1989 | Steele et al. | 702/40 |
| 5,047,966 | A | 9/1991 | Crow et al. | |
| 6,041,132 | A | 3/2000 | Isaacs et al. | |
| 6,748,112 | B1 | 6/2004 | Nguyen et al. | |
| 6,856,941 | B2 * | 2/2005 | Bradbury et al. | 702/182 |
| 6,943,570 | B2 * | 9/2005 | Duffy et al. | 324/718 |

FOREIGN PATENT DOCUMENTS

| | | | |
|---|---|---|---|
| EP | 1 498 577 | A2 | 1/2005 |
| RU | 1825019 | A1 * | 6/1996 |

OTHER PUBLICATIONS

Willi Bohl, "Stroemungsmachinen 2 (3. Auflage)", Vogel, Wuerzburg, XP009064990, 1998, pp. 89-111.

* cited by examiner

*Primary Examiner*—Elisio Ramos Feliciano
*Assistant Examiner*—Mi'schita' Henson
(74) *Attorney, Agent, or Firm*—Oblon, Spivak, McClelland, Maier & Neustadt, L.L.P.

(57) ABSTRACT

A method of checking turbomachine blades is presented that may be implemented using a computer and a measuring device. Turbomachine blades compatible with embodiments of the method have a profile including a centerline, suction face, pressure face, leading edge and trailing edge. The method measures geometrical coordinates of many points on a blade section profile, calculates an aerodynamic parameter of the blade section as a function of the measured coordinates, verifies whether the calculated aerodynamic parameter value departs from a valid range of parameters from a reference blade, and validates or rejects the blade depending upon whether the value of the aerodynamic parameter falls within the valid range.

12 Claims, 7 Drawing Sheets

CHECKING OF TURBOMACHINE BLADES

BACKGROUND OF THE INVENTION

1. Field of the Invention

Figure 1:
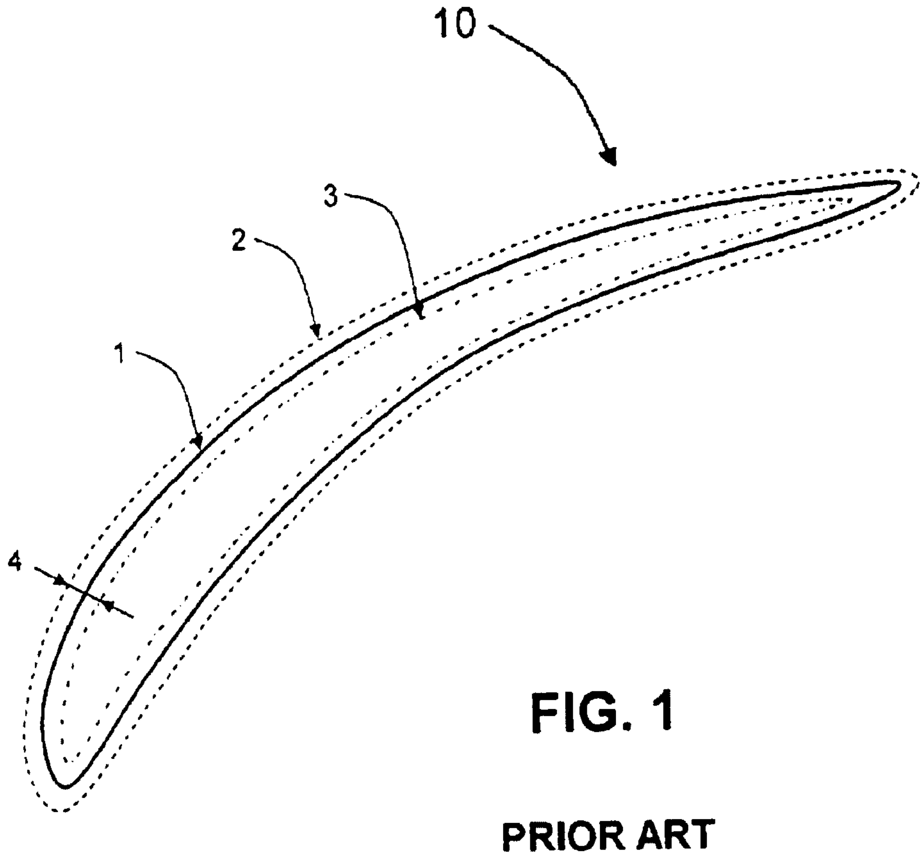
FIG. 1 PRIOR ART

The present invention relates to the checking of turbomachine blades.

After a turbomachine blade is manufactured and before the turbomachine blade is mounted on a rotor disk or a casing, a turbomachine blade is checked, that is to say inspected in order to determine whether this blade manufactured in an industrial process corresponds to a reference blade, that is to say to the theoretically desired blade. This essential check is used to verify the main deviations from the definition and to sanction possible discrepancies in performance.

This check proves to be even more important in the case of engines under development, especially for demonstrators or prototypes under development. This is because geometrical knowledge of the parts used makes it possible to overcome possible prejudicial discrepancies in the understanding of the operation of the turbomachine.

2. Description of Related Art

Various techniques for checking blades are known in the prior art. One essential step common to various checking techniques consists, according to the prior art, in making a three-dimensional recording in the Cartesian coordinates of a plurality of points of an inspected blade. The measurement is performed automatically by means of a device, known to those skilled in the art, comprising a support on which a blade to be measured is immobilized and at least one sensor for measuring the geometrical coordinates at various points on the blade. In a first variant, the support is immobile and the sensor can be moved mechanically. Conversely, in a second variant, the support can be moved mechanically and the sensor is immobile. In a third variant, both the support and the sensor can be moved mechanically.

Document U.S. Pat. No. 5,047,966 describes various techniques for the three-dimensional geometric measurement of a blade. Document U.S. Pat. No. 4,653,011 involves a contact technique in which the end of a sensor comes into contact with the object to be measured. Other techniques, which are contactless, make use of X-ray sources (U.S. Pat. No. 6,041,132) or laser sources (U.S. Pat. No. 4,724,525).

A standard technique for measuring the geometry of successive points is also described in U.S. Pat. No. 5,047,966. The cartesian coordinates of points are recorded in parallel sections of the blade. In the example cited, 840 discrete points are recorded in 28 parallel sections. The number of points may vary according to the desired precision. At the present time, 300 points may be required for a single section. These points on the measured blade are then stored in a memory on a computer recording medium.

To determine the conformity of the blade produced in an industrial process to the desired theoretical blade, on the one hand a model of a reference blade and, on the other hand, acceptable tolerances are provided.

This reference model defines an ideal blade by various geometrical points stored on a computer recording medium. Such a model is illustrated in document EP 1 498 577, which describes a table containing the cartesian coordinates of a reference blade. In this example, a tolerance of ±0.150 inches in a direction normal to the surface of any point on the checked blade is set. A checked blade departing from the reference blade can thus be rejected.

The tolerances may also take into account deviations in translation or in angular orientation, as described in document U.S. Pat. No. 6,748,112, without distinction between more relevant points than others. The prior art therefore relies on exclusively geometrical criteria for validating or rejecting a checked blade.

FIG. 1 shows schematically a blade section 10. According to the prior art, a tolerance 4 determined according to the geometrical deviation between the reference blade and the measured blade makes it possible to define the extreme deviations 2 and 3 that this checked blade can take. These deviations 2 and 3 define a space in which the checked blade 1 must lie in order not to be rejected. To carry out the measurement, the blade is preferably immobilized on a support.

The requirements in terms of desired precision at the present time are such that the mass of information, essentially consisting of the cartesian coordinates of all the measured points in a plurality of blade sections becomes considerable and it is difficult to synthesize it. Moreover, the geometrical deviations cannot be directly interpreted from an aerodynamics standpoint.

SUMMARY OF THE INVENTION

One object of the present invention is to solve the aforementioned problems. Contrary to the methods of checking turbomachine blades of the prior art, which check the conformity of the blades according to geometrical criteria for the entire blade, the blade checking method according to the invention proposes to check the blades according to relevant aerodynamic parameters at essential points with respect to the aerodynamic quality of the blade.

Another object of the invention is to synthesize the mass of information, essentially consisting of the cartesian coordinates of all the measured points, so that it can be more easily and more quickly processed.

According to the invention, the method of checking turbomachine blades having a profile comprising a centerline, a suction face, a pressure face, a leading edge and a trailing edge, consists in:

- measuring geometrical coordinates of a plurality of points located on the profile of at least one blade section;
- calculating at least one aerodynamic parameter of the blade section as a function of the measured coordinates;
- verifying whether the value of the calculated aerodynamic parameter departs from a validity range defined by a value of the nominal aerodynamic parameter of a reference blade and an associated tolerance; and
- validating the blade if the value of the aerodynamic parameter falls within the validity range or rejecting the blade if the value of the aerodynamic parameter lies outside the validity range.

The term “nominal parameter” is understood within the context of the present invention to mean the parameter as intended.

The aerodynamic parameters may in particular be the angle of attack of the blade, the blade entry or exit angle on the centerline, the suction face or the pressure face, and the blade entry and exit corresponding to regions located near the leading edge LE and trailing edge TE, respectively.

Such parameters can be aerodynamically interpreted more easily and the decision to validate or reject a checked blade can be made very quickly.

According to the invention, the check is preferably carried out on a limited number of cross sections with respect to what is called the radial axis, these sections being located near the base, in the middle and near the tip of the blade.

To carry out most of the steps of the checking method, a computer program, in other words a sequence of instructions and of data recorded on a medium, and capable of being processed by a computer, is preferably used. The present invention therefore also relates to a computer program that can be loaded directly into the memory of a computer, intended to implement the method according to the invention.

Moreover, the invention also relates to a set of means intended to implement the checking method, more precisely to a system of checking turbomachine blades, comprising:

- means for measuring the geometrical coordinates of a plurality of points on a checked blade;
- a means of calculating the aerodynamic parameters of the measured blade;
- a means of verifying the validity of the measured parameters with the nominal parameters and their associated tolerances of a reference blade; and
- a means of validating or rejecting the checked blade.

BRIEF DESCRIPTION OF THE DRAWING(S)

Figure 2:
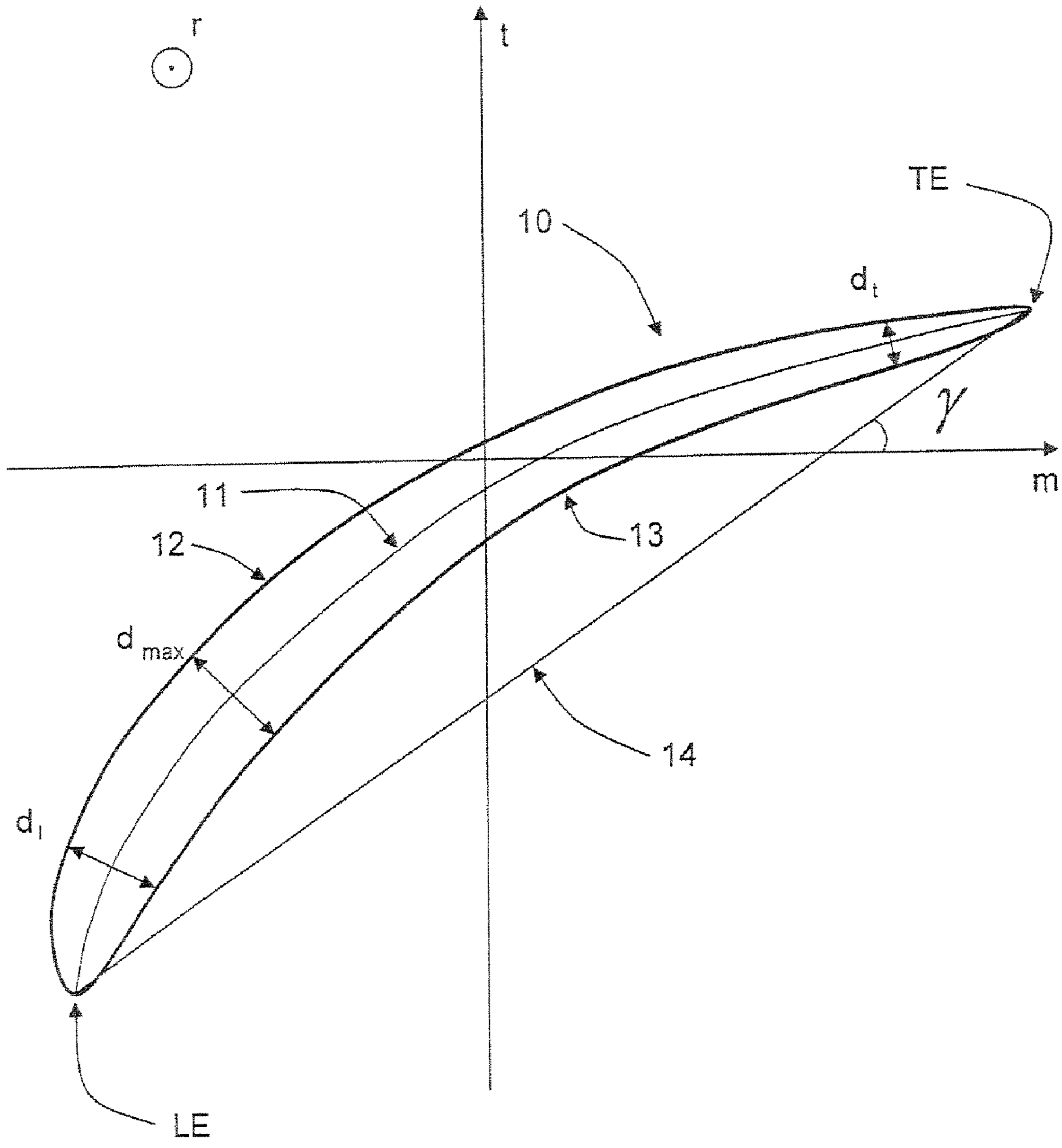
Figure 3:
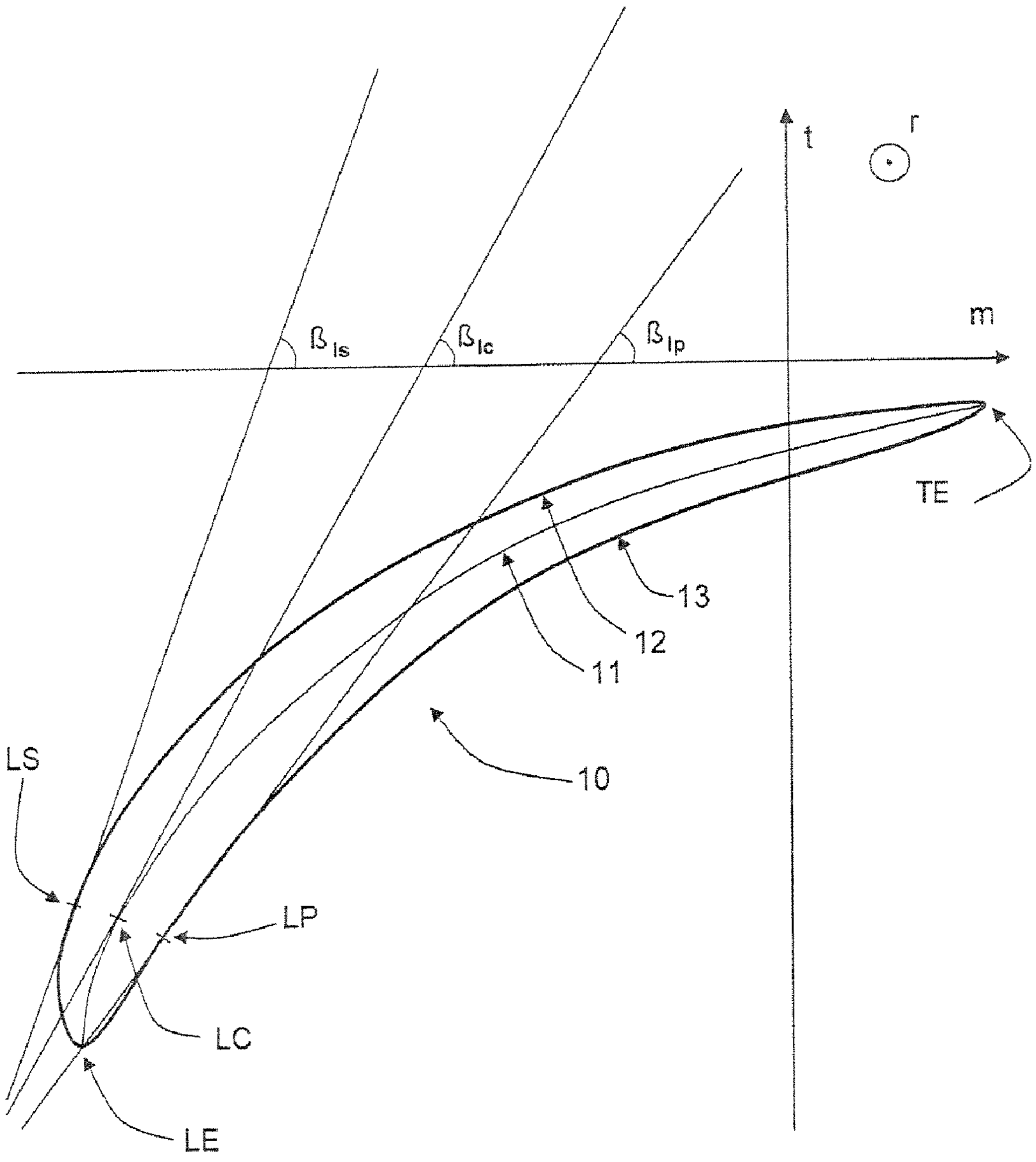
Figure 4:
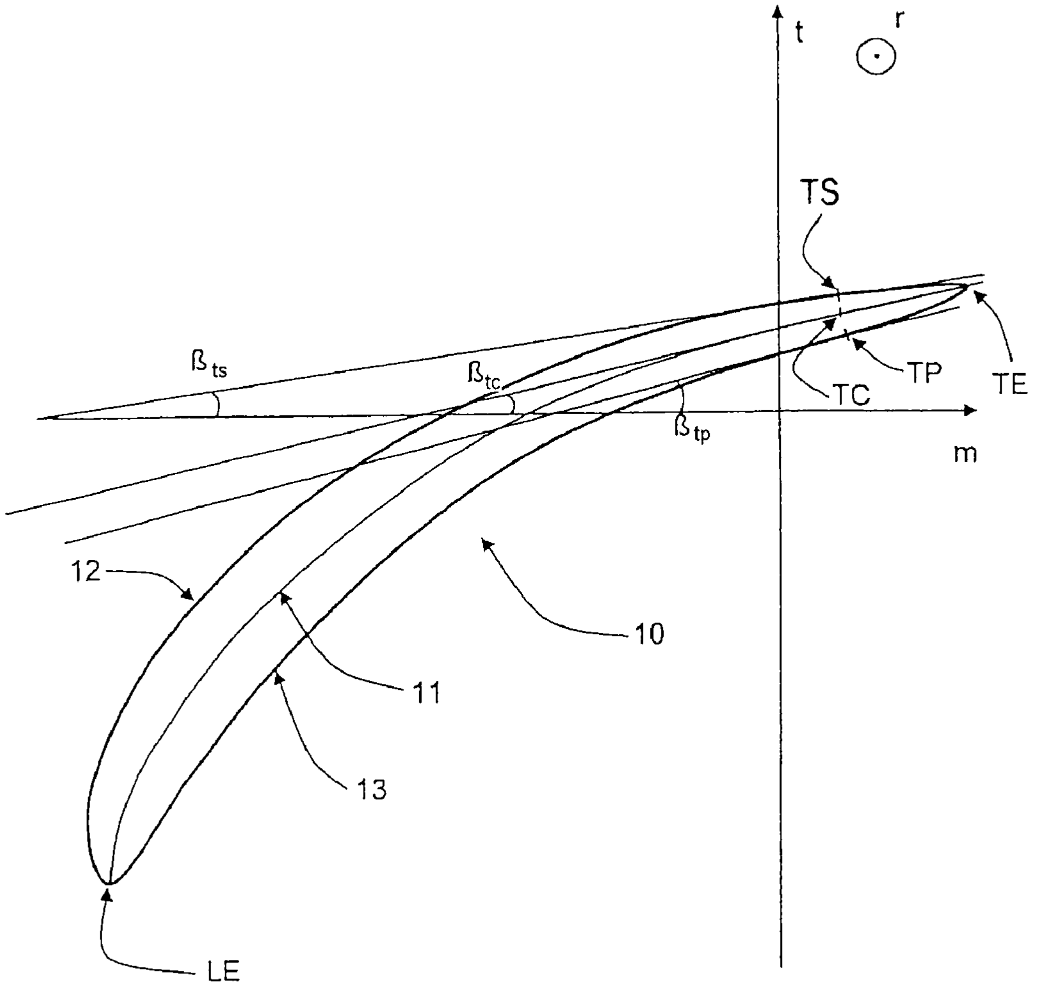
Figure 5:
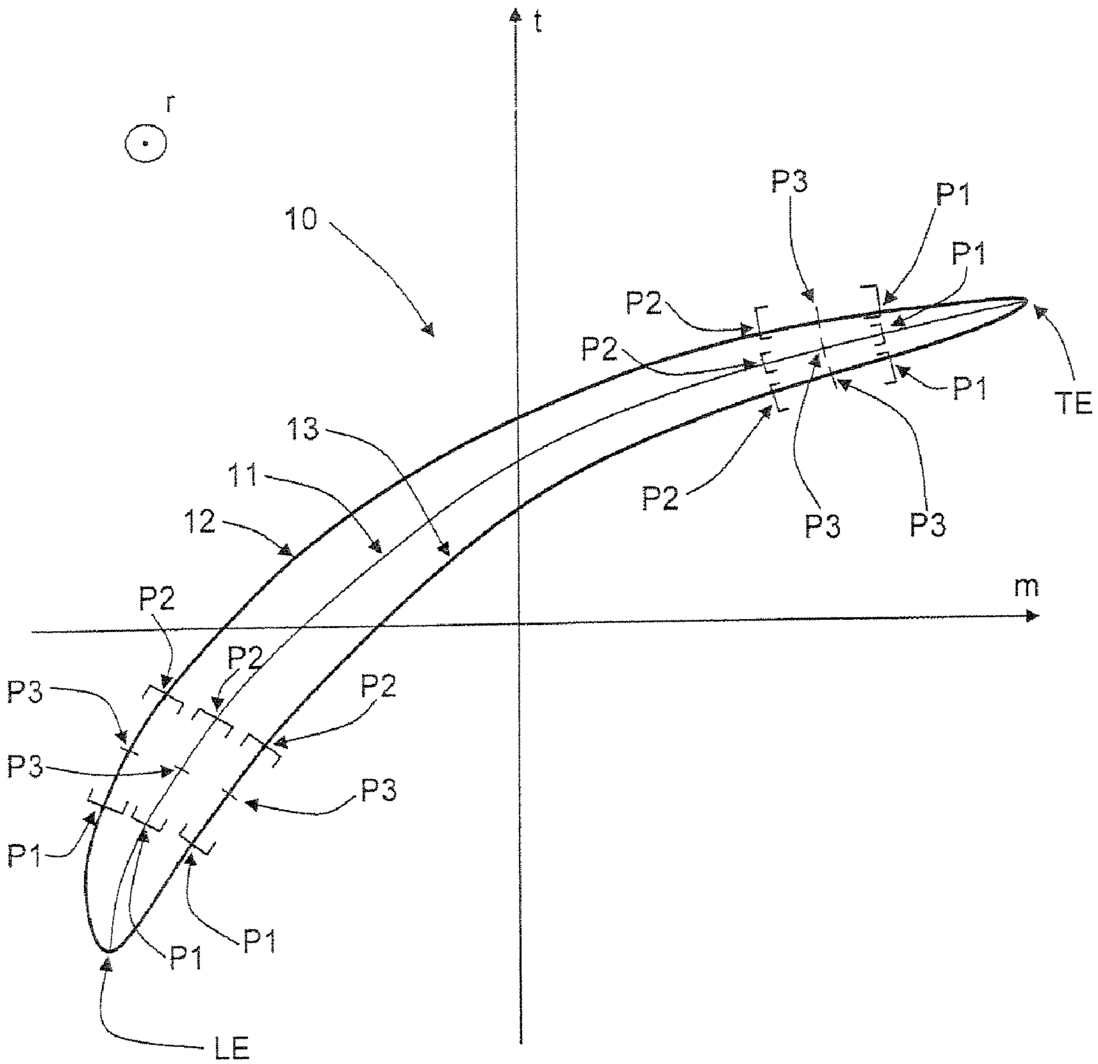
Figure 6:
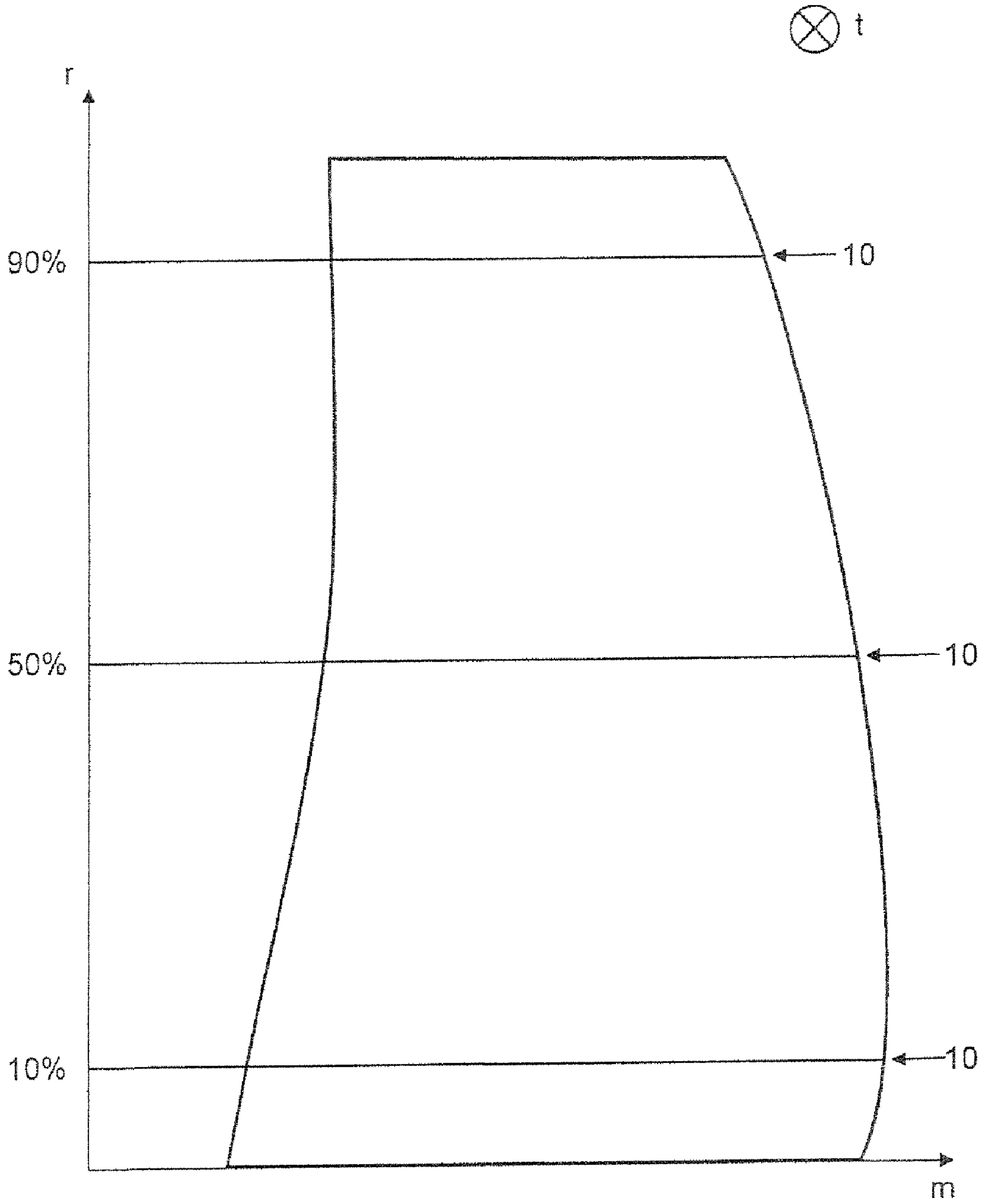
Figure 7:
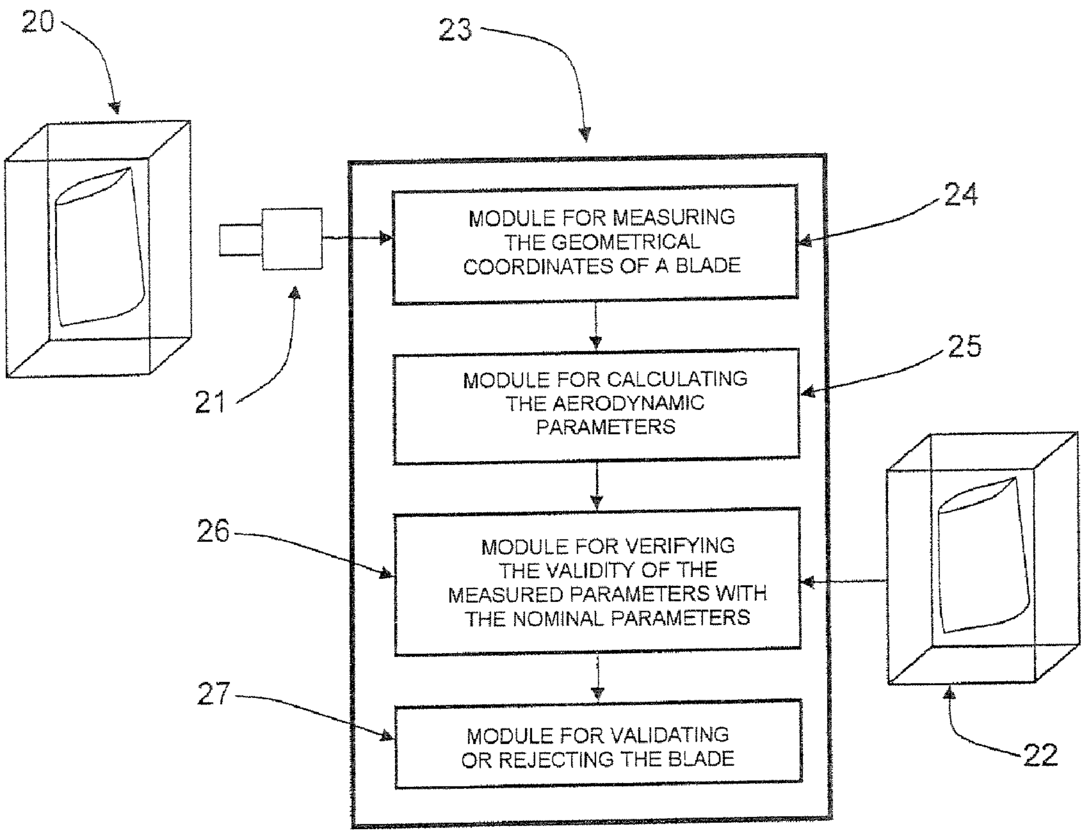

The invention will be more clearly understood and other features and advantages of the invention will become apparent on reading the rest of the description with reference to the appended drawings which show, respectively:

FIG. 1, a view of a section of a blade checked according to a technique of the prior art in a plane normal to the radial axis;

FIG. 2, a first view of a section of a blade checked according to the invention in a plane normal to the radial axis;

FIG. 3, a second view of a section of a blade checked according to the invention in a plane normal to the radial axis;

FIG. 4, a third view of a section of a blade checked according to the invention in a plane normal to the radial axis;

FIG. 5, a fourth view of a section of a blade checked according to the invention in a plane normal to the radial axis;

FIG. 6, a fifth view of a section of a blade checked according to the invention in a plane normal to the tangential axis; and FIG. 7, a system for checking the turbomachine blades.

DETAILED DESCRIPTION OF THE PREFERRED EMBODIMENTS

FIG. 2 shows a blade section 10 checked according to the invention, reconstructed from its measured cartesian coordinates for a given height of the blade. Because the blade is immobilized on the support, it is possible to define reference axes on this blade. The motor axis m represents the axis of rotation of the motor if the blade were installed on the rotor disk. The axis r represents a radial axis with respect to the axis of rotation of the motor. The axis t represents the tangential axis, normal to the two other axes m and r.

The various points on a section of the blade 10 make it possible, by calculation, to determine the chord 14 and the centerline 11 of the blade. On an aerodynamic part, such as a blade or a wing, the chord 14 is the segment whose ends are the leading edge LE and the trailing edge TE, the leading edge LE being the point most upstream on the blade profile with respect to a flow of air over this profile and the trailing edge TE being the point most downstream on the blade profile with respect to a flow of air over this profile. The centerline 11 of the blade, also called the skeleton or mean camber line, is the set of points equidistant from the suction face 12 and from the pressure face 13. All the parameters are calculated for a given blade section 10.

According to the method of the invention, a first checked parameter may be the angle of attack $\gamma$, that is to say the angle defined by the chord 14 of the blade and the motor axis m, as illustrated in FIG. 2.

Most of the distances involved in the parameters are calculated as reduced curvilinear abscissa on a curve which may, in the present invention, be the centerline 11, the suction face 12 or the pressure face 13 of a blade section 10. The curvilinear abscissa is reduced, which means that the length of the curve bounded by its two ends is dimensionless and that a distance, calculated on this curve starting from one of its ends, varies according to a scale from 0 to 1. For reasons of simplicity, the distances are expressed as a percentage of the total length of the curve starting from one of its ends.

A second checked parameter may be an angle $\beta_{1c}$ formed by:

- a tangent at the point LC located along the centerline 11 at a distance corresponding to a percentage P of the total length of the centerline 11 starting from the leading edge LE as curvilinear abscissa; and
- the motor axis m, as illustrated in FIG. 3.

This percentage P must be between 1% and 20%, the optimum percentage P being 7.2% as in the example shown in FIG. 2. It is unnecessary to check the parameters over the entire length. This is because it has been found that a parameter correct for this percentage P often implies that this parameter is correct over most of the length. An additional saving in time is therefore achieved by judiciously choosing the value of this percentage P.

A third checked parameter may be an angle $\beta_{ls}$ formed by:

- a tangent to the point LS located along the suction face 12 at a distance corresponding to a percentage P of the total length of the suction face 12 starting from the leading edge LE as curvilinear abscissa and
- the motor axis m, as illustrated in FIG. 3.

A fourth checked parameter may be an angle $\beta_{lp}$ formed by:

- a tangent to the point LP located along the pressure face 13 at a distance corresponding to a percentage P of the total length of the pressure face 13 starting from the leading edge LE as curvilinear abscissa and
- the motor axis m, as illustrated in FIG. 3.

A fifth checked parameter may be an angle $\beta_{tc}$ formed by:

- a tangent to the point TC located along the centerline 11 at a distance corresponding to a percentage of the total length of the centerline 11 starting from the trailing edge TF as curvilinear abscissa and
- the motor axis m, as illustrated in FIG. 4.

A sixth checked parameter may be an angle $\beta_{ts}$ formed by:

- a tangent to the point TS located along the suction face 12 at a distance corresponding to a percentage P of the total length of the suction face 12 starting from the trailing edge TE as curvilinear abscissa and
- the motor axis m, as illustrated in FIG. 4.

A seventh checked parameter may be an angle $\beta_{tp}$ formed by:

- a tangent to the point TP located along the pressure face 13 at a distance corresponding to a percentage P of the total length of the pressure face 13 starting from the trailing edge TE as curvilinear abscissa and
- the motor axis m, as illustrated in FIG. 4.

Several angles are defined to take into account the way in which the air flows while entering the blade near the leading edge. Specifically, FIG. 3 illustrates: $\beta_{lc}$ which is the blade entry angle on the centerline 11, $\beta_{ls}$ which is the blade entry angle on the suction face 12, and $\beta_{lp}$ which is the blade entry angle on the pressure face 13. Other angles are defined to take into account the way in which the air flows while exiting the blade near the trailing edge. Specifically, FIG. 4 illustrates: $\beta_{tc}$ which is the blade exit angle on the centerline 11, $\beta_{ts}$ which is the blade exit angle on the suction face 12, and $\beta_{tp}$ which is the blade exit angle on the pressure face 13.

An eighth checked parameter may be a thickness $d_l$ of the blade section 10 at a distance corresponding to a percentage P of the total length of the centerline 11 starting from the leading edge LE as curvilinear abscissa, as illustrated in FIG. 2. The thickness $d_l$ is calculated along a segment perpendicular to the centerline 11 in the plane of the blade section 10.

A ninth checked parameter may be a thickness $d_t$ of the blade section 10 at a distance corresponding to a percentage P of the total length of the centerline 11 starting from the trailing edge TE as curvilinear abscissa, as illustrated in FIG. 2. The thickness $d_t$ is calculated along a segment perpendicular to the centerline 11 in the plane of the blade section 10.

A tenth checked parameter may be a maximum thickness $d_{max}$ of the blade section 10, as illustrated in FIG. 2. The thickness $d_{max}$ is calculated along a segment perpendicular to the centerline 11 in the plane of the blade section 10, at the point on the centerline having the largest thickness of the blade section 10.

An eleventh checked parameter may be a value $VAR\beta_{lc}$ representing the maximum difference between:

- the value of the angle $\beta_{lc}$, at a distance corresponding to a percentage P3 of the total length of the centerline 11 starting from the leading edge LE as curvilinear abscissa, and
- the set of values of the angle $\beta_{lc}$, ever a portion lying between a percentage P1 and a percentage P2 of the total length of the centerline 11 starting from the leading edge LE as curvilinear abscissa, the value of P3 being the average of the values of P1 and P2.

FIG. 5 illustrates the intervals defined by the values P1 and P2 and the points P3. The method of calculating the angles involved is identical to the method of calculating the angles $\beta_{lc}$, $\beta_{ls}$, $\beta_{lp}$, $\beta_{tc}$, $\beta_{ts}$ and $\beta_{tp}$.

A twelfth checked parameter may be a value $VAR\beta_{ls}$ representing the maximum difference between:

- the value of the angle $\beta_{ls}$, at a distance corresponding to a percentage P3 of the total length of the suction face 12 starting from the leading edge LE as curvilinear abscissa, and
- the set of values of the angle $\beta_{ls}$, over a portion lying between a percentage P1 and a percentage P2 of the total length of the suction face 12 starting from the leading edge LE as curvilinear abscissa, the value of P3 being the average of the values of P1 and P2.

A thirteenth checked parameter may be a value $VAR\beta_{lp}$ representing the maximum difference between:

- the value of the angle $\beta_{lp}$, at a distance corresponding to a percentage P3 of the total length of the pressure face 13 starting from the leading edge LE as curvilinear abscissa, and
- the set of values of the angle $\beta_{lp}$, over a portion lying between a percentage P1 and a percentage P2 of the total length of the pressure face 13 starting from the leading edge LE as curvilinear abscissa, the value of P3 being the average of the values of P1 and P2.

A fourteenth checked parameter may be a value $VAR\beta_{tc}$ representing the maximum difference between:

- the value of the angle $\beta_{tc}$, at a distance corresponding to a percentage P3 of the total length of the centerline 11 starting from the trailing edge TE as curvilinear abscissa, and
- the set of values of the angle $\beta_{tc}$, over a portion lying between a percentage P1 and a percentage P2 of the total length of the centerline 11 starting from the trailing edge TE as curvilinear abscissa, the value of P3 being the average of the values of P1 and P2.

A fifteenth checked parameter may be a value $VAR\beta_{ts}$ representing the maximum difference between:

- the value of the angle $\beta_{ts}$, at a distance corresponding to a percentage P3 of the total length of the suction face 12 starting from the trailing edge TE as curvilinear abscissa, and
- the set of values of the angle $\beta_{ts}$, over a portion lying between a percentage P1 and a percentage P2 of the total length of the suction face 12 starting from the trailing edge TE as curvilinear abscissa, the value of P3 being the average of the values of P1 and P2.

A sixteenth checked parameter may be a value $VAR\beta_{tp}$ representing the maximum difference between:

- the value of the angle $\beta_{tp}$, at a distance corresponding to a percentage P3 of the total length of the pressure face 13 starting from the trailing edge TE as curvilinear abscissa, and
- the set of values of the angle $\beta_{tp}$, over a portion lying between a percentage P1 and a percentage P2 of the total length of the pressure face 13 starting from the trailing edge TE as curvilinear abscissa, the value of P3 being the average of the values of P1 and P2.

A seventeenth checked parameter may be a value $AV\beta_{lc}$ representing the average value of the angle $\beta_{lc}$ over a portion lying between a percentage P1 and a percentage P2 of the total length of the centerline 11 starting from the leading edge LE as curvilinear abscissa.

An eighteenth checked parameter may be a value $AV\beta_{ls}$ representing the average value of the angle $\beta_{ls}$ over a portion lying between a percentage P1 and a percentage P2 of the total length of the suction face 12 starting from the leading edge LE as curvilinear abscissa.

A nineteenth checked parameter may be a value $AV\beta_{lp}$ representing the average value of the angle $\beta_{lp}$ over a portion lying between a percentage P1 and a percentage P2 of the total length of the pressure face 13 starting from the leading edge LE as curvilinear abscissa.

A twentieth checked parameter may be the value $AV\beta_{tc}$ representing the average value of the angle $\beta_{tc}$ over a portion lying between a percentage P1 and a percentage P2 of the total length of the centerline 11 starting from the trailing edge TE as curvilinear abscissa.

A twenty-first checked parameter may be a value $AV\beta_{ts}$ representing the average value of the angle $\beta_{ts}$ over a portion lying between a percentage P1 and a percentage P2 of the total length of the suction face 12 starting from the trailing edge TE as curvilinear abscissa.

A twenty-second checked parameter may be a value $AV\beta_{tp}$ representing the average value of the angle $\beta_{tp}$ over a portion lying between a percentage P1 and a percentage P2 of the total length of the pressure face 13 starting from the trailing edge TE as curvilinear abscissa.

The values P1 and P2 fall within the [1%-20%] interval. It is preferable for this interval to relate to a portion representative of the centerline, of the suction face or of the pressure face essentially upstream of the point LC, LS or LP relative to the direction of flow of the air. Likewise, it is also preferable for this interval to relate to a portion representative of the centerline, of the suction face or of the pressure face essentially downstream of the point TC, TS or TP with respect to the direction of flow of the air.

The [7%-13%] interval makes it possible to obtain significant results, allowing a greater precision of the checked parameter.

In order to check the turbomachine blades, it is possible to combine a check taking into account the aerodynamic parameters defined above with a conventional check of the prior art.

According to a preferred method of implementing the invention, several aerodynamic parameters are chosen simultaneously to check the blade, these parameters being the angle of attack $\gamma$, the angle $\beta_{lc}$, the angle $\beta_{ls}$, the angle $\beta_{tc}$, the angle $\beta_{ts}$, the thickness $d_l$, the thickness $d_t$, the thickness $d_{max}$, VAR$\beta_{lc}$, VAR$\beta_{ls}$ and VAR$\beta_{ts}$ of the blade section 10. This selection of more relevant parameters makes it possible to limit the number of parameters so as to make them more easily exploitable. Moreover, it has been found that the validity of these parameters implies, quite systematically, the validity of the entire blade section 10.

The following table illustrates examples of parameters for a given blade section and also the tolerance associated with each parameter.

| PARAMETER | TOLERANCE |
|---|---|
| $\gamma$ (in degrees) | ±0.5 |
| $\beta_{lc}$ (in degrees) | ±2 |
| $\beta_{ls}$ (in degrees) | ±2 |
| $\beta_{tc}$ (in degrees) | ±1.5 |
| $\beta_{ts}$ (in degrees) | ±1.5 |
| $d_l$ (in mm) | ±0.15 |
| $d_t$ (in mm) | ±0.15 |
| $d_{max}$ (in mm) | ±0.15 |

Each nominal aerodynamic parameter defines, with its associated tolerance, a validity range within which the measured aerodynamic parameter must lie in order to validate the blade. When the measured aerodynamic parameter does not lie within this validity range, the measured blade is rejected.

If a plurality of aerodynamic parameters are taken into consideration in the method, an aerodynamic parameter not lying within its corresponding validity range would entail rejection of the blade. All of the chosen parameters must be valid in order for the checked blade to be validated.

These parameters may be calculated for a plurality of sections of a checked blade, each of the sections having separate nominal parameters. However, it may be judicious to take into account a limited number of sections. This is because it has been found that the fact of selecting and checking three sections located near the base, in the middle and near the tip of a blade, respectively, is sufficient to have an idea of the overall validity of the blade.

A section located near the base may be a section lying between 0% and 30% of the height of a blade. A section located near the middle may be a section lying between 30% and 70% of the height of a blade. A section located near the tip may be a section lying between 70% and 100% of the height of a blade. Preferably, the three sections are located at 10%, 50% and 90% respectively, of the height of the blade, as illustrated in FIG. 6.

A blade, the sections 10 of which at 10%, 50% and 90% of its height meet the criteria according to the invention, has, quite systematically, sections that are valid over its entire height. Conversely, a blade in which one of the three sections 10 does not meet the criteria described above has, quite systematically, a plurality of incorrect sections over its entire height. An additional time saving is therefore achieved by judiciously choosing significant sections.

The method according to the invention makes it possible to save a considerable amount of time in checking the blades, especially after their manufacture.

The processing corresponding to each step of the method, especially the calculations of the various parameters, may advantageously be implemented by a computer program organized in modules 24, 25, 26 and 27, each module carrying out one step of the checking method.

The invention also relates to a system for checking turbomachine blades, comprising means 21 for measuring the geometrical coordinates of a plurality of points on a blade 20 to be checked, and a means 23 for the processing of a computer program intended to implement the method of checking turbomachine blades.

Such a system is illustrated in FIG. 7, in which the measurement means 21 may be a measurement means known from the prior art. The means 23 for processing a computer program may be a computer which includes a memory in which the computer program intended to implement the method of checking turbomachine blades according to the invention is stored.

The system for checking turbomachine blades designed to implement the method of checking turbomachine blades according to the invention essentially comprises the following means:

means 21 and 24 for measuring the geometrical coordinates of a plurality of points on a checked blade 20;

a means 25 of calculating the aerodynamic parameters of the measured blade 20;

a means 26 of verifying the validity of the measured parameters with the nominal parameters and their associated tolerances of a reference blade 22; and a means 27 of validating or rejecting the checked blade 20.

The invention claimed is:

1. A method of checking a turbomachine blade, comprising:

choosing at least one aerodynamic parameter of the turbomachine blade to verify if the at least one aerodynamic parameter is within a validity range, the at least one aerodynamic parameter is chosen from a group of aerodynamic parameters comprising $\beta_{lc}$, $\beta_{ls}$, $\beta_{lp}$, $\beta_{tc}$, $\beta_{ts}$, $\beta_{tp}$, VAR$\beta_{lc}$, VAR$\beta_{ls}$, VAR$\beta_{lp}$, VAR$\beta_{tc}$, VAR$\beta_{ts}$, VAR$\beta_{tp}$, AV$\beta_{lc}$, AV$\beta_{ls}$, AV$\beta_{lp}$, AV$\beta_{tc}$, AV$\beta_{ts}$, and AV$\beta_{tp}$, and the turbomachine blade having a profile comprising a centerline, a suction face, a pressure face, a leading edge and a trailing edge;

measuring with a measuring device a plurality of geometrical coordinates of a plurality of points located on the profile of at least one blade section;

calculating with a processor the at least one aerodynamic parameter of the blade section as a function of the plurality of geometrical coordinates;

verifying whether the at least one calculated aerodynamic parameter departs from the validity range defined by a value of a nominal aerodynamic parameter of a reference blade and an associated tolerance; and validating the turbomachine blade if the value of the calculated aerodynamic parameter falls within the validity range or rejecting the turbomachine blade if the value of the calculated aerodynamic parameter lies outside the validity range, wherein $\beta_{lc}$, $\beta_{ls}$, $\beta_{lp}$, $\beta_{tc}$, $\beta_{ts}$, and $\beta_{tp}$ are blade entry angles defined by tangents to points LC, LS, LP, TC, TS, and TP located along the centerline, the suction face or the pressure face, at a distance corresponding to a percentage P of a total length of the centerline, of the suction face, or of the pressure face, starting from the leading edge or from the trailing edge as a curvilinear abscissa and a motor axis, wherein the percentage P being within a 1 percent to 20 percent range of the total length of the centerline, of the suction face or of the pressure face as the curvilinear abscissa, wherein $VAR\beta_{lc}$, $VAR\beta_{ls}$, $VAR\beta_{lp}$, $VAR\beta_{tc}$, $VAR\beta_{ts}$, and $VAR\beta_{tp}$ are a maximum difference between: a value of the blade entry angles, at a distance corresponding to a third percentage P3 of the total length of the centerline, of the suction face or of the pressure face, starting from the leading edge or the trailing edge as the curvilinear abscissa and a set of values of the blade entry angles, over a portion lying between a first percentage P1 and a second percentage P2 of the total length of the centerline, of the suction face or of the pressure face starting from the leading edge or the trailing edge as the curvilinear abscissa, and the third percentage P3 being the average of the first percentage P1 and the second percentage P2, wherein $AV\beta_{lc}$, $AV\beta_{ls}$, $AV\beta_{lp}$, $AV\beta_{tc}$, $AV\beta_{ts}$, and $AV\beta_{tp}$ are an average value of the blade entry angles over a portion lying between the first percentage P1 and the second percentage P2 of the total length of the centerline, of the suction face or of the pressure face starting from the leading edge or the trailing edge as the curvilinear abscissa, and wherein the first percentage P1 and the second percentage P2 lying within a 1 percent to 20 percent range.

2. The method according to claim 1, wherein the group of aerodynamic parameters further comprises $d_l$, $d_t$, $d_{max}$, and angle of attack, wherein the $d_l$ and the $d_t$ are thicknesses of a turbomachine blade section at a distance corresponding to the percentage P of the total length of the centerline starting from the leading edge or the trailing edge as the curvilinear abscissa, the $d_{max}$ is a maximum thickness of the turbomachine blade section, and the angle of attack is the angle of attack for the turbomachine blade section.

3. The method according to claim 2, wherein in the choosing at least one aerodynamic parameter, several of the group of aerodynamic parameters are chosen simultaneously, the several being the angle of attack, the angle ($\beta_{lc}$), the angle ($\beta_{ls}$), the angle ($\beta_{tc}$), the angle ($\beta_{ts}$), the thickness ($d_l$), the thickness ($d_t$), the thickness ($d_{max}$), $VAR\beta_{lc}$, $VAR\beta_{ls}$ and $VAR\beta_{ts}$.

4. The method according to claim 3, wherein the percentage P is 7.2%.

5. The method according to claim 3, wherein the first percentage P1 and the second percentage P2 fall within a range from 7 percent to 13 percent.

6. The method according to claim 3 wherein the calculated aerodynamic parameters are checked for three blade sections which are located near a base of the turbomachine blade, a middle of the turbomachine blade, and near a tip of the turbomachine blade, respectively.

7. The method according to claim 6, wherein the three blade sections which are located near the base, the middle and near the tip of the turbomachine blade are located at 10%, 50% and 90% of a height of the turbomachine blade, respectively.

8. The method according to claim 3, further comprising:

mechanically moving the measuring device so that it comes into contact with the blade section, wherein the measuring device is a sensor.

9. The method according to claim 3, wherein the measuring device includes a x-ray source.

10. The method according to claim 3, wherein the measuring device includes a laser source.

11. A non-transitory computer readable medium including computer executable instructions, wherein the instructions, when executed by a processor, cause the processor to perform a method comprising:

choosing at least one aerodynamic parameter of the turbomachine blade to verify if the at least one aerodynamic parameter is within a validity range, the at least one aerodynamic parameter is chosen from a group of aerodynamic parameters comprising $\beta_{lc}$, $\beta_{ls}$, $\beta_{lp}$, $\beta_{tc}$, $\beta_{ts}$, $\beta_{tp}$, $VAR\beta_{lc}$, $VAR\beta_{ls}$, $VAR\beta_{lp}$, $VAR\beta_{tc}$, $VAR\beta_{ts}$, $VAR\beta_{tp}$, $AV\beta_{lc}$, $AV\beta_{ls}$, $AV\beta_{lp}$, $AV\beta_{tc}$, $AV\beta_{ts}$, and $AV\beta_{tp}$, and the turbomachine blade having a profile comprising a centerline, a suction face, a pressure face, a leading edge and a trailing edge;

measuring with the measuring device a plurality of geometrical coordinates of a plurality of points located on the profile of at least one blade section of a turbomachine blade;

calculating with the processor at least one aerodynamic parameter of the blade section as a function of the plurality of geometrical coordinates, and the at least one aerodynamic parameter includes a blade entry angle;

verifying whether the at least one calculated aerodynamic parameter departs from a validity range defined by a value of a nominal aerodynamic parameter of a reference blade and an associated tolerance; and validating the turbomachine blade if the value of the calculated aerodynamic parameter falls within the validity range or rejecting the turbomachine blade if the value of the calculated aerodynamic parameter lies outside the validity range, wherein $\beta_{lc}$, $\beta_{ls}$, $\beta_{lp}$, $\beta_{tc}$, $\beta_{ts}$, and $\beta_{tp}$ are blade entry angles defined by tangents to points LC, LS, LP, TC, TS, and TP located along the centerline, the suction face or the pressure face, at a distance corresponding to a percentage P of a total length of the centerline, of the suction face, or of the pressure face, starting from the leading edge or from the trailing edge as a curvilinear abscissa and a motor axis, wherein the percentage P being within a 1 percent to 20 percent range of the total length of the centerline, of the suction face or of the pressure face as the curvilinear abscissa, wherein $VAR\beta_{lc}$, $VAR\beta_{ls}$, $VAR\beta_{lp}$, $VAR\beta_{tc}$, $VAR\beta_{ts}$, and $VAR\beta_{tp}$ are a maximum difference between: a value of the blade entry angles, at a distance corresponding to a third percentage P3 of the total length of the centerline, of the suction face or of the pressure face, starting from the leading edge or the trailing edge as the curvilinear abscissa and a set of values of the blade entry angles, over a portion lying between a first percentage P1 and a second percentage P2 of the total length of the centerline, of the suction face or of the pressure face starting from the leading edge or the trailing edge as the curvilinear abscissa, and the third percentage P3 being the average of the first percentage P1 and the second percentage P2, wherein $AV\beta_{lc}$, $AV\beta_{ls}$, $AV\beta_{lp}$, $AV\beta_{tc}$, $AV\beta_{ts}$, and $AV\beta_{tp}$ are an average value of the blade entry angles over a portion lying between the first percentage P1 and the second percentage P2 of the total length of the centerline, of the suction face or of the pressure face starting from the leading edge or the trailing edge as the curvilinear abscissa, and wherein the first percentage P1 and the second percentage P2 lying within a 1 percent to 20 percent range.

12. A system for checking turbomachine blades, comprising:

a measuring device measuring a plurality of geometrical coordinates of a plurality of points on a non-validated blade; and a processor calculating an aerodynamic parameter of the non-validated blade, the processor verifying a validity of the calculated aerodynamic parameter by determining whether it is within a range established by a nominal parameter and an associated tolerance of a reference blade, and the processor validating or rejecting the non-validated blade depending upon whether the calculated aerodynamic parameter is within the range, wherein the aerodynamic parameter is chosen from a group of aerodynamic parameters comprising $\beta_{lc}$, $\beta_{ls}$, $\beta_{lp}$, $\beta_{tc}$, $\beta_{ts}$, $\beta_{tp}$, VAR$\beta_{lc}$, VAR$\beta_{ls}$, VAR$\beta_{lp}$, VAR$\beta_{tc}$, VAR$\beta_{ts}$, VAR$\beta_{tp}$, AV$\beta_{lc}$, AV$\beta_{ls}$, AV$\beta_{lp}$, AV$\beta_{tc}$, AV$\beta_{ts}$, and AV$\beta_{tp}$, and the turbomachine blade having a profile comprising a centerline, a suction face, a pressure face, a leading edge and a trailing edge, wherein $\beta_{lc}$, $\beta_{ls}$, $\beta_{lp}$, $\beta_{tc}$, $\beta_{ts}$, and $\beta_{tp}$ are blade entry angles defined by tangents to points LC, LS, LP, TC, TS, and TP located along the centerline, the suction face or the pressure face, at a distance corresponding to a percentage P of a total length of the centerline, of the suction face, or of the pressure face, starting from the leading edge or from the trailing edge as a curvilinear abscissa and a motor axis, wherein the percentage P being within a 1 percent to 20 percent range of the total length of the centerline, of the suction face or of the pressure face as the curvilinear abscissa, wherein VAR$\beta_{lc}$, VAR$\beta_{ls}$, VAR$\beta_{lp}$, VAR$\beta_{tc}$, VAR$\beta_{ts}$, and VAR$\beta_{tp}$ are a maximum difference between: a value of the blade entry angles, at a distance corresponding to a third percentage P3 of the total length of the centerline, of the suction face or of the pressure face, starting from the leading edge or the trailing edge as the curvilinear abscissa and a set of values of the blade entry angles, over a portion lying between a first percentage P1 and a second percentage P2 of the total length of the centerline, of the suction face or of the pressure face starting from the leading edge or the trailing edge as the curvilinear abscissa, and the third percentage P3 being the average of the first percentage P1 and the second percentage P2, wherein AV$\beta_{lc}$, AV$\beta_{ls}$, AV$\beta_{lp}$, AV$\beta_{tc}$, AV$\beta_{ts}$, AV$\beta_{tp}$ are an average value of the blade entry angles over a portion lying between the first percentage P1 and the second percentage P2 of the total length of the centerline, of the suction face or of the pressure face starting from the leading edge or the trailing edge as the curvilinear abscissa, and wherein the first percentage P1 and the second percentage P2 lying within a 1 percent to 20 percent range.

* * * * *